(12) United States Patent
Chuang et al.

(10) Patent No.: US 10,590,258 B2
(45) Date of Patent: Mar. 17, 2020

(54) CARBON FIBER PRECURSOR COMPOSITION AND METHOD FOR PREPARING CARBON FIBER PRECURSOR

(71) Applicant: INDUSTRIAL TECHNOLOGY RESEARCH INSTITUTE, Hsinchu (TW)

(72) Inventors: Chung-Yang Chuang, Hsinchu (TW); Kai-Jen Hsiao, Zhunan Township (TW); Jing-Wen Tang, Hsinchu (TW); Tzong-Ming Lee, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 168 days.

(21) Appl. No.: 15/856,792

(22) Filed: Dec. 28, 2017

(65) Prior Publication Data

US 2019/0153194 A1     May 23, 2019

(30) Foreign Application Priority Data

Nov. 22, 2017  (TW) .............................. 106140523 A

(51) Int. Cl.
| | |
|---|---|
| C08K 5/09 | (2006.01) |
| C08F 220/44 | (2006.01) |
| C08K 5/3412 | (2006.01) |
| D01F 9/22 | (2006.01) |
| C08K 5/17 | (2006.01) |
| D01F 6/38 | (2006.01) |
| C08F 2/38 | (2006.01) |

(52) U.S. Cl.
CPC .................. *C08K 5/09* (2013.01); *C08F 2/38* (2013.01); *C08F 220/44* (2013.01); *C08K 5/17* (2013.01); *C08K 5/3412* (2013.01); *D01F 6/38* (2013.01); *D01F 9/22* (2013.01); *C08F 2800/20* (2013.01)

(58) Field of Classification Search
CPC .......... C08K 5/09; C08K 5/17; C08K 5/3412; C08F 220/44; C08F 2800/20; D01F 9/22
USPC ........................................................ 524/718
See application file for complete search history.

(56) References Cited

U.S. PATENT DOCUMENTS

| | | | |
|---|---|---|---|
| 3,917,776 A * | 11/1975 | Sato .......................... | D01F 9/22 |
| | | | 423/447.5 |
| 5,162,476 A | 11/1992 | Hisatani et al. | |
| 7,338,997 B2 | 3/2008 | Kuwahara et al. | |
| 2006/0183834 A1 | 8/2006 | Kuwahara et al. | |
| 2017/0191194 A1 | 7/2017 | Jackson et al. | |

FOREIGN PATENT DOCUMENTS

| | | |
|---|---|---|
| CN | 1536107 A | 10/2004 |
| CN | 1657666 A | 8/2005 |
| CN | 1247838 C | 3/2006 |
| CN | 100436493 C | 11/2008 |
| CN | 101849063 A | 9/2010 |
| CN | 104562265 * | 4/2015 |
| CN | 105525388 A | 4/2016 |
| CN | 105585660 A | 5/2016 |
| EP | 1589042 B1 | 3/2009 |
| JP | 2003-336130 A | 11/2003 |
| KR | 10-2010-0073483 A | 7/2010 |

OTHER PUBLICATIONS

Translation of CN104562265, Apr. 29, 2015. (Year: 2015).*
Jamil et al., "Synthesis and Thermal Properties of Acrylonitrile/Butyl Acrylate/Fumaronitrile and Acrylonitrile/Ethyl Hexyl Acrylate/Fumaronitrile Terpolymers as a Potential Precursor for Carbon Fiber," Materials, vol. 7, Sep. 1, 2014, pp. 6207-6223.
Taiwanese Office Action and Search Report for Taiwanese Application No. 106140523, dated Sep. 28, 2018.
Nakano et al., "Highly isotactic polyacrylonitriles prepared using dialkylmagnesium/water systems as initiators," Polymer International, vol. 35, No. 3, 1994, pp. 249-255.
Nakano et al., "Synthesis of highly isotactic (mm> 0.70) polyacrylonitrile by anionic polymerization using diethylberyllium as a main initiator," Polymer International, vol. 35, No. 2, 1994, pp. 207-213.

* cited by examiner

*Primary Examiner* — Hui H Chin
(74) *Attorney, Agent, or Firm* — Birch, Stewart, Kolasch & Birch, LLP

(57) ABSTRACT

A carbon fiber precursor composition and a method for preparing carbon fiber precursor are provided. The carbon fiber precursor composition includes 100 parts by weight of acrylonitrile; 1-15 parts by weight of co-monomer; and, 0.1-3 parts by weight of stereoregularity controlling agent. The stereoregularity controlling agent has a structure represented by formula (I), Formula (II), Formula (III), or Formula (IV):

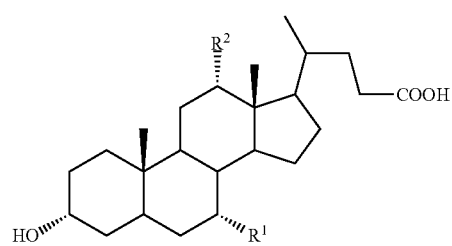

Formula (I)

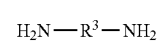

Formula (II)

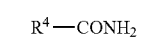

Formula (III)

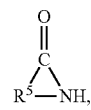

Formula (IV)

wherein $R^1$ and $R^2$ are hydrogen, —OH, —COOH, or —NH$_2$; $R^3$ is $C_{2-8}$ alkylene, or carbonyl; $R^4$ is hydrogen, or $C_{1-6}$ alkyl; and, $R^5$ is $C_{3-6}$ alkylene.

22 Claims, No Drawings

CARBON FIBER PRECURSOR COMPOSITION AND METHOD FOR PREPARING CARBON FIBER PRECURSOR

CROSS REFERENCE TO RELATED APPLICATIONS

The application is based on, and claims priority from, Taiwan Application Serial Number 106140523, filed on Nov. 22, 2017, the disclosure of which is hereby incorporated by reference herein in its entirety.

TECHNICAL FIELD

The technical field relates to a carbon fiber precursor composition and a method for preparing a carbon fiber precursor.

BACKGROUND

Carbon fiber serves as an important structural reinforcement material in the composite material field. The physical properties of carbon fiber are determined by means of the precursor.

A high isotactic polyacrylonitrile copolymer, serving as the carbon fiber precursor can enhance the physical properties of the carbon fiber obtained. At present, the high isotactic polyacrylonitrile copolymer can be prepared via solid-state polymerization or anionic polymerization, but the conventional method does not meet the requirements for mass production due to the process complexity. Furthermore, since it is difficult to remove the metal initiator or template used in the conventional method, the carbon fiber prepared by the conventional method exhibits poor physical properties resulting from defects that occur during preparation.

Therefore, a novel method for preparing high isotactic polyacrylonitrile copolymer is required to solve the aforementioned problems.

SUMMARY

According to embodiments of the disclosure, the disclosure provides a carbon fiber precursor composition, which can be used for the preparation of carbon fiber precursor. The carbon fiber precursor composition includes 100 parts by weight of acrylonitrile; 1-15 parts by weight of co-monomer; and, 0.1-3 parts by weight of stereoregularity controlling agent, wherein the stereoregularity controlling agent has a structure represented by Formula (I), Formula (II), Formula (III), or Formula (IV):

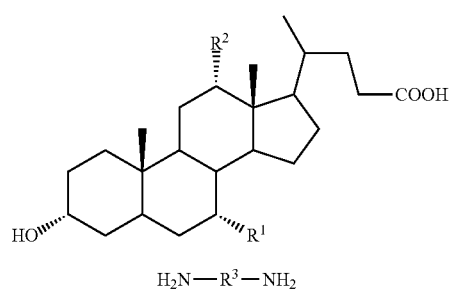

Formula (I)

Formula (II)

R$^4$—CONH$_2$  Formula (III)

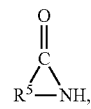

Formula (IV)

wherein R$^1$ and R$^2$ are independently hydrogen, —OH, —COOH, or —NH$_2$; R$^3$ is C$_{2-8}$ alkylene, or carbonyl; R$^4$ is hydrogen, or C$_{1-6}$ alkyl; and, R$^5$ is C$_{3-6}$ alkylene.

According to another embodiment of the disclosure, the disclosure provides a method for preparing a carbon fiber precursor. The method for preparing a carbon fiber precursor includes subjecting a carbon fiber precursor composition to undergo polymerization to obtain the carbon fiber precursor. The carbon fiber precursor composition includes 100 parts by weight of acrylonitrile; 1-15 parts by weight of co-monomer; and, 0.1-3 parts by weight of stereoregularity controlling agent. The stereoregularity controlling agent has a structure represented by formula (I), formula (II), formula (III), or formula (IV):

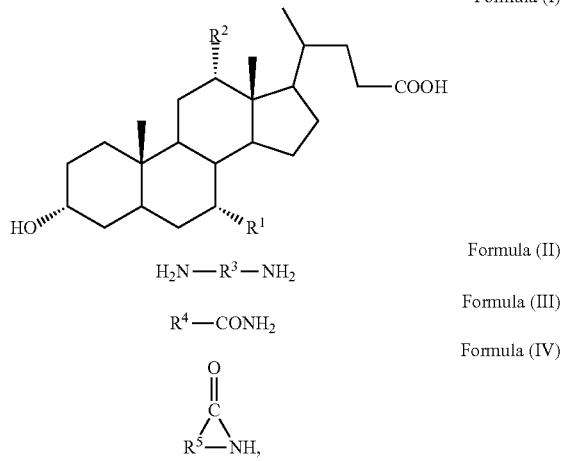

wherein R$^1$ and R$^2$ are independently hydrogen, —OH, —COOH, or —NH$_2$; R$^3$ is C$_{2-8}$ alkylene, or carbonyl; R$^4$ is hydrogen, or C$_{1-6}$ alkyl; and, R$^5$ is C$_{3-6}$ alkylene.

A detailed description is given in the following embodiments with reference to the accompanying drawings.

DETAILED DESCRIPTION

The carbon fiber precursor composition of the disclosure employs high isotactic polyacrylonitrile copolymer (having an isotacticity of more than 30%) as carbon fiber precursor. Due to the high arrangement regularity and low crystal defects of the high isotactic polyacrylonitrile copolymer, the obtained carbon fiber exhibits superior mechanical properties. The polyacrylonitrile copolymer is generally prepared via solution polymerization or suspension polymerization. The above two conventional methods for preparing the polyacrylonitrile copolymer have a simple process flow and are suitable for mass production. The polyacrylonitrile copolymer prepared from the above two conventional methods, however, exhibits low isotacticity of about 23% to 27%, since the polymerization direction of the monomers cannot be controlled. In order to solve the aforementioned problems, the embodiments of the disclosure provide a carbon fiber precursor composition and the method for preparing the carbon fiber precursor composition. According to embodiments of the disclosure, the polyacrylonitrile copolymer is prepared in the presence of the stereoregularity controlling agent in the polymerization system. Due to the intermolecular force between the stereoregularity controlling agent and the acrylonitrile monomer, the polymerization direction of the acrylonitrile monomer can be controlled, resulting in increasing the amount of isotactic polyacrylonitrile of the obtained polyacrylonitrile copolymer.

According to embodiments of the disclosure, the disclosure provides a carbon fiber precursor composition. The carbon fiber precursor composition includes 100 parts by weight of acrylonitrile; about 1-15 parts by weight of co-monomer; and, about 0.1-3 parts by weight of stereoregularity controlling agent The stereoregularity controlling agent has a structure represented by Formula (I), Formula (II), Formula (III), or Formula (IV):

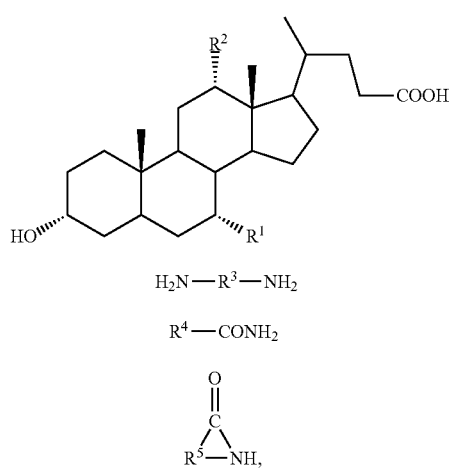

Formula (I)

$$H_2N-R^3-NH_2 \quad \text{Formula (II)}$$

$$R^4-CONH_2 \quad \text{Formula (III)}$$

Formula (IV)

wherein $R^1$ and $R^2$ can be independently hydrogen, —OH, —COOH, or —NH$_2$; $R^3$ can be $C_{2-8}$ alkylene, or carbonyl; $R^4$ is hydrogen, or $C_{1-6}$ alkyl; and, $R^5$ can be $C_{3-6}$ alkylene.

According to embodiments of the disclosure, $C_{2-8}$ alkylene can be ethylene group, propylene group, butylene group, pentylene group, hexylene group, heptylene group, or octylene group. Namely, $R^3$ can be ethylene group, propylene group, butylene group, pentylene group, hexylene group, heptylene group, or octylene group. In addition, $R^5$ can be propylene group, butylene group, pentylene group, or hexylene group.

According to embodiments of the disclosure, $C_{1-6}$ alkyl can be linear or branched alkyl, such as methyl, ethyl, propyl, isopropyl, n-butyl, t-butyl, sec-butyl, isobutyl, pentyl, or hexyl. For example, $R^4$ can be methyl, ethyl, propyl, isopropyl, n-butyl, t-butyl, sec-butyl, isobutyl, pentyl, or hexyl.

According to embodiments of the disclosure, the parts by weight of the co-monomer can be about 1-15 parts by weight, such as about 1-15 parts by weight, 2-15 parts by weight, 1-10 parts by weight, 2-10 parts by weight, or 2-8 parts by weight, based on 100 parts by weight of acrylonitrile.

According to embodiments of the disclosure, the co-monomer can be has at least one reactive functional group 的 monomer, wherein the reactive functional group can be

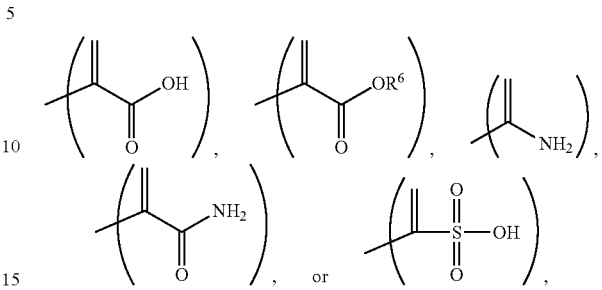

wherein $R^6$ can be $C_{1-6}$ alkyl, for example, $R^6$ can be methyl, ethyl, propyl, isopropyl, n-butyl, t-butyl, sec-butyl, isobutyl, pentyl, or hexyl.

According to embodiments of the disclosure, the co-monomer can be methyl acrylate, methyl methacrylate, methacrylic acid, itaconic acid, ethenamine, acrylamide, methacrylamide, vinylsulfonic acid, isobutyl methacrylate, tert-butyl methacrylate, or a combination thereof.

According to embodiments of the disclosure, the co-monomer can include a first co-monomer and a second co-monomer. The first co-monomer can have a moiety represented by

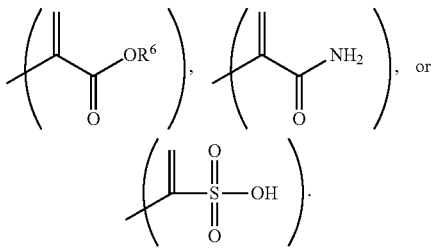

For example, the first co-monomer can be methyl acrylate, methyl methacrylate, acrylamide, methacrylamide, or vinylsulfonic acid. The second co-monomer can have a moiety represented by

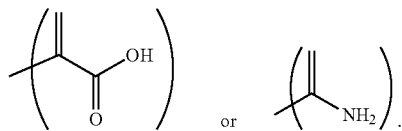

For example, the second co-monomer can be methacrylic acid, itaconic acid, or ethenamine.

According to embodiments of the disclosure, the parts by weight of the stereoregularity controlling agent can be about 0.1-3 parts by weight, such as about 0.1-2 parts by weight, 0.2-3 parts by weight, 0.1-1.5 parts by weight, or 0.2-1.5 parts by weight, based on 100 parts by weight of acrylonitrile. When the parts by weight of the stereoregularity controlling agent are too low, the isotacticity of the carbon fiber precursor would not be increased. When the parts by weight of the stereoregularity controlling agent are too high, the polymerization conversion rate and molecular weight of the carbon fiber precursor would be reduced.

According to embodiments of the disclosure, the stereoregularity controlling agent can be cholic acid, deoxycholic acid, chenodeoxycholic acid, lithocholic acid, 1,2-diaminoethane, 1,3-diaminopropane, 1,4-diaminobutane, 1,5-diaminopentane, 1,6-diaminohexane, urea, formamide, acetamide, propionamide, butyramide, isobutyramide, valeramide, 2-pyrrolidinone, valerolactam, caprolactam, or a combination thereof.

According to embodiments of the disclosure, the carbon fiber precursor composition can further include a solvent. The amount of solvent can optionally be adjusted, resulting in that the acrylonitrile, the co-monomer and the stereoregularity controlling agent are uniformly distributed in the solvent. For example, the carbon fiber precursor composition can include about 300-500 parts by weight (such as about 300-450 parts by weight, about 400-500 parts by weight, or about 350-450 parts by weight) of solvent, based on 100 parts by weight of acrylonitrile.

According to embodiments of the disclosure, the solvent can be dimethylsulfoxide, dimethylacetamide, dimethylformamide, tetrahydrofuran, dichloromethane, chloroform, ethylene carbonate, propylene carbonate, methylethyl ketone, or water.

According to embodiments of the disclosure, the carbon fiber precursor composition can further include about 0.01-0.3 parts by weight (such as about 0.01-0.2 parts by weight, or about 0.1-0.3 parts by weight) of initiator, based on 100 parts by weight of acrylonitrile. The initiator can be peroxide initiator, azo compound initiator, persulfate initiator, or photoinitiator.

According to embodiments of the disclosure, the peroxide initiator can be benzoyl peroxide, 1,1-bis(tert-butylperoxy)cyclohexane, 2,5-bis(tert-butylperoxy)-2,5-dimethylcyclohexane, 2,5-bis(tert-butylperoxy)-2,5-dimethyl-3-cyclohexyne, bis(1-(tert-butylperoxy)-1-methy-ethyl)benzene, tert-butyl hydroperoxide, tert-butyl peroxide, tert-butyl peroxybenzoate, cumene hydroperoxide, cyclohexanone peroxide, dicumyl peroxide, lauroyl peroxide, or a combination thereof.

According to embodiments of the disclosure, the azo compound initiator can be N,N'-azobisisobutyronitrile (AIBN), 2,2'-azobisisoheptonitrile (ABVN), 2,2'-azobis-(2-methylbutyronitrile (AMBN), 1,1'-Azobis(cyclohexane-1-carbonitrile (ACCN), 1-((cyano-1-methylethyl)azo)formamide (CABN), 2,2'-azobis(2-methylpropionamide) dihydrochloride (MBA), dimethyl 2,2'-azobis(2-methylpropionate (AIBME), 2,2'-azobis[2-(2-imidazolin-2-yl)propane]dihydrochloride (AIBI), or a combination thereof.

According to embodiments of the disclosure, the persulfate initiator can be sodium persulfate, potassium persulfate, ammonium persulfate or a combination thereof.

According to embodiments of the disclosure, the photoinitiator can be benzophenone, benzoin, 2-hydroxy-2-methyl-1-phenyl-propan-1-one, 2,2-dimethoxy-1,2-diphenylethan-1-one, 1-hydroxy cyclohexyl phenyl ketone, 2,4,6-trimethylbenzoyl diphenyl phosphine oxide, 9-phenylacridine, benzyldimethylketal, 4,4'-bis(dimethylamino)benzophenone, 2,4,5-triarylimidazole dimers or a combination thereof.

According to embodiments of the disclosure, the disclosure also provides a method for preparing a carbon fiber precursor, wherein the carbon fiber precursor can be polyacrylonitrile copolymer (polyacrylonitrile copolymer). According to embodiments of the disclosure, the method for preparing a carbon fiber precursor includes subjecting a carbon fiber precursor composition to undergo polymerization to obtain the carbon fiber precursor.

According to embodiments of the disclosure, the process for subjecting carbon fiber precursor composition to undergo polymerization includes the following steps. First, oxygen dissolved in the carbon fiber precursor composition is removed. Next, the carbon fiber precursor composition is heated to a specific temperature (such as about 30-100° C.) under nitrogen atmosphere or irradiated by light to undergo the polymerization, obtaining the carbon fiber precursor.

According to embodiments of the disclosure, the disclosure also provides a method for preparing a carbon fiber. The method for preparing a carbon fiber includes the following steps. First, a spinning solution is subjected to a spinning process, obtaining a precursor fiber. Next, the precursor fiber is subjecting to an oxidation process, obtaining a pre-oxidized fiber. Next, the pre-oxidized fiber is subjected to a thermal treatment, obtaining the carbon fiber. The spinning solution includes a carbon fiber precursor. The method for preparing a carbon fiber precursor includes subjecting the carbon fiber precursor composition of the disclosure to polymerization, obtaining the carbon fiber precursor.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

Preparation of Carbon Fiber Precursor Composition

Example 1

100 parts by weight of acrylonitrile (manufactured and sold by Sigma-Aldrich), 7 parts by weight of methyl acrylate (manufactured and sold by Sigma-Aldrich), 0.645 parts by weight of itaconic acid (manufactured and sold by Sigma-Aldrich), 0.107 parts by weight N,N'-azobisisobutyronitrile, manufactured and sold by Sigma-Aldrich), and 0.268 parts by weight of 1,2-diaminoethane were dissolved in 429.6 parts by weight dimethylsulfoxide (manufactured and sold by Tedia), obtaining a solution. After introducing nitrogen gas into the solution and stirring, the solution was heated to 70° C. to undergo a reaction. After reacting for 24 hr, the result was put into methanol, wherein the weight ratio of the result to methanol is 1:3. Next, the precipitate was collected, obtaining polyacrylonitrile-methyl acrylate-itaconic acid copolymer (serving as the carbon fiber precursor). The copolymer was analyzed by carbon-13 nuclear magnetic resonance (NMR) spectrometer (Avance III HD NMR, Bruker), and then the ratio of isotactic polyacrylonitrile to the copolymer was measured. The results are shown in Table 1.

Example 2

100 parts by weight of acrylonitrile (manufactured and sold by Sigma-Aldrich), 7 parts by weight of methyl acrylate (manufactured and sold by Sigma-Aldrich), 0.645 parts by weight of itaconic acid (manufactured and sold by Sigma-Aldrich), 0.107 parts by weight N,N'-azobisisobutyronitrile, manufactured and sold by Sigma-Aldrich), and 0.535 parts by weight 1,6-diaminohexane (manufactured and sold by Sigma-Aldrich) were dissolved in 429.3 parts by weight dimethylsulfoxide (manufactured and sold by Tedia), obtaining a solution. After introducing nitrogen gas into the solution and stirring, the solution was heated to 70° C. to undergo a reaction. After reacting for 24 hr, the result was put into methanol, wherein the weight ratio of the result to methanol is 1:3. Next, the precipitate was collected, obtaining polyacrylonitrile-methyl acrylate-itaconic acid copolymer (serving as the carbon fiber precursor). The copolymer was analyzed by carbon-13 nuclear magnetic resonance (NMR) spectrometer (Avance III HD NMR, Bruker), and then the ratio of isotactic polyacrylonitrile to the copolymer was measured. The results are shown in Table 1.

Example 3

100 parts by weight of acrylonitrile (manufactured and sold by Sigma-Aldrich), 7 parts by weight of methyl acrylate (manufactured and sold by Sigma-Aldrich), 0.645 parts by weight of itaconic acid (manufactured and sold by Sigma-Aldrich), 0.107 parts by weight N,N'-azobisisobutyronitrile, manufactured and sold by Sigma-Aldrich), and 0.268 parts by weight deoxycholic acid (manufactured and sold by Sigma-aldrich) were dissolved in 429.6 parts by weight dimethylsulfoxide (manufactured and sold by Tedia), obtaining a solution. After introducing nitrogen gas into the solution and stirring, the solution was heated to 70° C. to undergo a reaction. After reacting for 24 hr, the result was put into methanol, wherein the weight ratio of the result to methanol is 1:3. Next, the precipitate was collected, obtaining polyacrylonitrile-methyl acrylate-itaconic acid copolymer (serving as the carbon fiber precursor). The copolymer was analyzed by carbon-13 nuclear magnetic resonance (NMR) spectrometer (Avance III HD NMR, Bruker), and then the ratio of isotactic polyacrylonitrile to the copolymer was measured. The results are shown in Table 1.

Comparative Example 1

100 parts by weight of acrylonitrile (manufactured and sold by Sigma-Aldrich), 7 parts by weight of methyl acrylate (manufactured and sold by Sigma-Aldrich), 0.645 parts by weight of itaconic acid (manufactured and sold by Sigma-Aldrich), and 0.107 parts by weight N,N'-azobisisobutyronitrile, manufactured and sold by Sigma-Aldrich) were dissolved in 429.8 parts by weight dimethylsulfoxide (manufactured and sold by Tedia), obtaining a solution. After introducing nitrogen gas into the solution and stirring, the solution was heated to 70° C. to undergo a reaction. After reacting for 24 hr, the result was put into methanol, wherein the weight ratio of the result to methanol is 1:3. Next, the precipitate was collected, obtaining polyacrylonitrile-methyl acrylate-itaconic acid copolymer (serving as the carbon fiber precursor). The copolymer was analyzed by carbon-13 nuclear magnetic resonance (NMR) spectrometer (Avance III HD NMR, Bruker), and then the ratio of isotactic polyacrylonitrile to the copolymer was measured. The results are shown in Table 1.

Comparative Example 2

100 parts by weight of acrylonitrile (manufactured and sold by Sigma-Aldrich), 7 parts by weight of methyl acrylate (manufactured and sold by Sigma-Aldrich), 0.645 parts by weight of itaconic acid (manufactured and sold by Sigma-Aldrich), and 0.107 parts by weight N,N'-azobisisobutyronitrile, manufactured and sold by Sigma-Aldrich) were dissolved in 323.4 parts by weight of dimethylsulfoxide (manufactured and sold by Tedia), obtaining a solution. After introducing nitrogen gas into the solution and stirring, the solution was heated to 70° C. to undergo a reaction. After reacting for 24 hr, the result was put into methanol, wherein the weight ratio of the result to methanol is 1:3. Next, the precipitate was collected, obtaining polyacrylonitrile-methyl acrylate-itaconic acid copolymer (serving as the carbon fiber precursor). The copolymer was analyzed by carbon-13 nuclear magnetic resonance (NMR) spectrometer (Avance III HD NMR, Bruker), and then the ratio of isotactic polyacrylonitrile to the copolymer was measured. The results are shown in Table 1.

Comparative Example 3

100 parts by weight of acrylonitrile (manufactured and sold by Sigma-Aldrich), 7 parts by weight of methyl acrylate (manufactured and sold by Sigma-Aldrich), 0.645 parts by weight of itaconic acid (manufactured and sold by Sigma-Aldrich), 0.107 parts by weight N,N'-azobisisobutyronitrile, manufactured and sold by Sigma-Aldrich), and 0.535 parts by weight of triethylamine (triethyl amine, manufactured and sold by Sigma-Aldrich) were dissolved in 429.3 parts by weight dimethylsulfoxide (manufactured and sold by Tedia), obtaining a solution. After introducing nitrogen gas into the solution and stirring, the solution was heated to 70° C. to undergo a reaction. After reacting for 24 hr, the result was put into methanol, wherein the weight ratio of the result to methanol is 1:3. Next, the precipitate was collected, obtaining polyacrylonitrile-methyl acrylate-itaconic acid copolymer (serving as the carbon fiber precursor). The copolymer was analyzed by carbon-13 nuclear magnetic resonance (NMR) spectrometer (Avance III HD NMR, Bruker), and then the ratio of isotactic polyacrylonitrile to the copolymer was measured. The results are shown in Table 1.

TABLE 1

| | acrylonitrile monomer (parts by weight) | methyl acrylate (parts by weight) | itaconic acid (parts by weight) | stereoregularity controlling agent (parts by weight) | N,N'-azobisisobutyronitrile (parts by weight) | dimethylsulfoxide (parts by weight) | the ratio of isotactic polyacrylonitrile to the copolymer |
|---|---|---|---|---|---|---|---|
| Example 1 | 100 | 7 | 0.645 | 0.268 (1,2-diaminoethane) | 0.107 | 429.6 | 30.1% |
| Example 2 | 100 | 7 | 0.645 | 0.535 (1,6-diaminohexane) | 0.107 | 429.3 | 30.2% |
| Example 3 | 100 | 7 | 0.645 | 0.268 (deoxycholic acid) | 0.107 | 429.6 | 31.0% |
| Comparative Example 1 | 100 | 7 | 0.645 | — | 0.107 | 429.8 | 28.7% |

TABLE 1-continued

| | acrylonitrile monomer (parts by weight) | methyl acrylate (parts by weight) | itaconic acid (parts by weight) | stereoregularity controlling agent (parts by weight) | N,N'-azobisisobutyronitrile (parts by weight) | dimethylsulfoxide (parts by weight) | the ratio of isotactic polyacrylonitrile to the copolymer |
|---|---|---|---|---|---|---|---|
| Comparative Example 2 | 100 | 7 | 0.645 | — | 0.107 | 323.4 | 25.7% |
| Comparative Example 3 | 100 | 7 | 0.645 | 0.535 (triethylamine) | 0.107 | 429.3 | 27.1% |

As shown in Table 1, due to the addition of the stereoregularity controlling agent, the ratio of isotactic polyacrylonitrile to the copolymer of the copolymers as disclosed in Examples 1-3 is increased (i.e. the ratio is greater than about 30%). In Comparative Examples 1-2, due to the absence of the stereoregularity controlling agent, the ratio of isotactic polyacrylonitrile to the copolymer of the copolymers as disclosed in Comparative Examples 1-2 is relatively low. Although triethylamine is added in the polymerization system in Comparative Example 3, the ratio of isotactic polyacrylonitrile to the copolymer of the copolymers as disclosed in Comparative Examples 1-2 is still relatively low.

Example 4

100 parts by weight of acrylonitrile (manufactured and sold by Sigma-Aldrich), 7 parts by weight of methyl acrylate (manufactured and sold by Sigma-Aldrich), 0.645 parts by weight of itaconic acid (manufactured and sold by Sigma-Aldrich), 0.107 parts by weight N,N'-azobisisobutyronitrile, manufactured and sold by Sigma-Aldrich), and 0.535 parts by weight of caprolactam (caprolactam, manufactured and sold by Sigma-Aldrich) were dissolved in 429.3 parts by weight dimethylsulfoxide (manufactured and sold by Tedia), obtaining a solution. After introducing nitrogen gas into the solution and stirring, the solution was heated to 70° C. to undergo a reaction. After reacting for 24 hr, the result was put into methanol, wherein the weight ratio of the result to methanol is 1:3. Next, the precipitate was collected, obtaining polyacrylonitrile-methyl acrylate-itaconic acid copolymer (serving as the carbon fiber precursor). The copolymer was analyzed by carbon-13 nuclear magnetic resonance (NMR) spectrometer (Avance III HD NMR, Bruker), and then the ratio of isotactic polyacrylonitrile to the copolymer was measured. The results are shown in Table 2.

Example 5

100 parts by weight of acrylonitrile (manufactured and sold by Sigma-Aldrich), 7 parts by weight of methyl acrylate (manufactured and sold by Sigma-Aldrich), 0.645 parts by weight of itaconic acid (manufactured and sold by Sigma-Aldrich), 0.107 parts by weight N,N'-azobisisobutyronitrile, manufactured and sold by Sigma-Aldrich), 1.07 parts by weight of caprolactam were dissolved in 428.8 parts by weight dimethylsulfoxide (manufactured and sold by Tedia), obtaining a solution. After introducing nitrogen gas into the solution and stirring, the solution was heated to 70° C. to undergo a reaction. After reacting for 24 hr, the result was put into methanol, wherein the weight ratio of the result to methanol is 1:3. Next, the precipitate was collected, obtaining polyacrylonitrile-methyl acrylate-itaconic acid copolymer (serving as the carbon fiber precursor). The copolymer was analyzed by carbon-13 nuclear magnetic resonance (NMR) spectrometer (Avance III HD NMR, Bruker), and then the ratio of isotactic polyacrylonitrile to the copolymer was measured. The results are shown in Table 2.

Example 6

100 parts by weight of acrylonitrile (manufactured and sold by Sigma-Aldrich), 7 parts by weight of methyl acrylate (manufactured and sold by Sigma-Aldrich), 0.645 parts by weight of itaconic acid (manufactured and sold by Sigma-Aldrich), 0.107 parts by weight N,N'-azobisisobutyronitrile, manufactured and sold by Sigma-Aldrich), 0.268 parts by weight of caprolactam were dissolved in 428.5 parts by weight dimethylsulfoxide (manufactured and sold by Tedia), obtaining a solution. After introducing nitrogen gas into the solution and stirring, the solution was heated to 70° C. to undergo a reaction. After reacting for 24 hr, the result was put into methanol, wherein the weight ratio of the result to methanol is 1:3. Next, the precipitate was collected, obtaining polyacrylonitrile-methyl acrylate-itaconic acid copolymer (serving as the carbon fiber precursor). The copolymer was analyzed by carbon-13 nuclear magnetic resonance (NMR) spectrometer (Avance III HD NMR, Bruker), and then the ratio of isotactic polyacrylonitrile to the copolymer was measured. The results are shown in Table 2.

TABLE 2

| | acrylonitrile monomer (parts by weight) | methyl acrylate (parts by weight) | itaconic acid (parts by weight) | stereoregularity controlling agent (parts by weight) | N,N'-azobisisobutyronitrile (parts by weight) | dimethylsulfoxide (parts by weight) | the ratio of isotactic polyacrylonitrile to the copolymer |
|---|---|---|---|---|---|---|---|
| Example 4 | 100 | 7 | 0.645 | 0.535 | 0.107 | 429.3 | 30.3% |
| Example 5 | 100 | 7 | 0.645 | 1.07 (caprolactam) | 0.107 | 428.8 | 30.0% |
| Example 6 | 100 | 7 | 0.645 | 0.268 (caprolactam) | 0.107 | 428.5 | 29.9% |

As shown in Table 2, due to the addition of the stereoregularity controlling agent, the ratio of isotactic polyacrylonitrile to the copolymer of the copolymers as disclosed in Examples 4-6 is increased (i.e. the ratio is greater than about 30%).

Example 7

100 parts by weight of acrylonitrile (manufactured and sold by Sigma-Aldrich), 1.43 parts by weight of methyl acrylate (manufactured and sold by Sigma-Aldrich), 0.61 parts by weight of itaconic acid (manufactured and sold by Sigma-Aldrich), 0.102 parts by weight N,N'-azobisisobutyronitrile, manufactured and sold by Sigma-Aldrich), 0.51 parts by weight of caprolactam were dissolved in 407.5 parts by weight dimethylsulfoxide (manufactured and sold by Tedia), obtaining a solution. After introducing nitrogen gas into the solution and stirring, the solution was heated to 70° C. to undergo a reaction. After reacting for 24 hr, the result was put into methanol, wherein the weight ratio of the result to methanol is 1:3. Next, the precipitate was collected, obtaining polyacrylonitrile-methyl acrylate-itaconic acid copolymer (serving as the carbon fiber precursor). The copolymer was analyzed by carbon-13 nuclear magnetic resonance (NMR) spectrometer (Avance III HD NMR, Bruker), and then the ratio of isotactic polyacrylonitrile to the copolymer was measured. The results are shown in Table 3.

Example 8

100 parts by weight of acrylonitrile (manufactured and sold by Sigma-Aldrich), 1.43 parts by weight of isobutyl methyl acrylate (manufactured and sold by Sigma-Aldrich), 0.61 parts by weight of itaconic acid (manufactured and sold by Sigma-Aldrich), 0.102 parts by weight N,N'-azobisisobutyronitrile, manufactured and sold by Sigma-Aldrich), 0.51 parts by weight of caprolactam were dissolved in 407.5 parts by weight of dimethylsulfoxide (manufactured and sold by Tedia), obtaining a solution. After introducing nitrogen gas into the solution and stirring, the solution was heated to 70° C. to undergo a reaction. After reacting for 24 hr, the result was put into methanol, wherein the weight ratio of the result to methanol is 1:3. Next, the precipitate was collected, obtaining polyacrylonitrile-isobutyl methyl acrylate-itaconic acid copolymer (serving as the carbon fiber precursor). The copolymer was analyzed by carbon-13 nuclear magnetic resonance (NMR) spectrometer (Avance III HD NMR, Bruker), and then the ratio of isotactic polyacrylonitrile to the copolymer was measured. The results are shown in Table 3.

As shown in Table 3, in Example 8, isobutyl methyl acrylate and itaconic acid are used for serving as co-monomer, and the ratio of isotactic polyacrylonitrile to the copolymer of the copolymers as disclosed in Example 8 is greater than about 30%.

Accordingly, the carbon fiber precursor composition of the disclosure can be used for the preparation of the carbon fiber precursor. According to embodiments of the disclosure, the carbon fiber precursor (such as polyacrylonitrile copolymer) is prepared in the presence of the stereoregularity controlling agent in the polymerization system. Due to the intermolecular force between the stereoregularity controlling agent and the acrylonitrile monomer, the polymerization direction of the acrylonitrile monomer can be controlled, resulting in increasing the amount of isotactic polyacrylonitrile of the obtained polyacrylonitrile copolymer.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A carbon fiber precursor composition, comprising:
   100 parts by weight of acrylonitrile;
   1-15 parts by weight of co-monomer; and
   0.1-3 parts by weight of stereoregularity controlling agent, wherein the stereoregularity controlling agent has a structure represented by Formula (I), Formula (II), Formula (III), or Formula (IV):

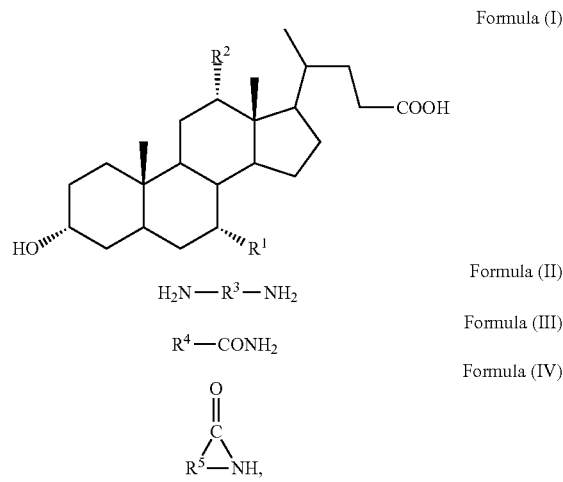

Formula (I)

Formula (II)
$H_2N-R^3-NH_2$

Formula (III)
$R^4-CONH_2$

Formula (IV)

wherein $R^1$ and $R^2$ are independently hydrogen, —OH, —COOH, or —NH$_2$; $R^3$ is $C_{2-8}$ alkylene, or carbonyl; $R^4$ is hydrogen, or $C_{1-6}$ alkyl; and, $R^5$ is $C_{3-6}$ alkylene.

TABLE 3

| | acrylonitrile monomer (parts by weight) | co-monomer (parts by weight) | itaconic acid (parts by weight) | stereoregularity controlling agent (parts by weight) | N,N'-azobisisobutyronitrile (parts by weight) | dimethylsulfoxide (parts by weight) | the ratio of isotactic polyacrylonitrile to the copolymer |
|---|---|---|---|---|---|---|---|
| Example 7 | 100 | 1.43 (methyl acrylate) | 0.61 | 0.51 (caprolactam) | 0.102 | 407.5 | 30.2% |
| Example 8 | 100 | 1.43 (isobutyl methyl acrylate) | 0.61 | 0.51 (caprolactam) | 0.102 | 407.5 | 30.8% |

2. The carbon fiber precursor composition as claimed in claim 1, wherein the co-monomer has at least one reactive functional group, wherein the reactive functional group is

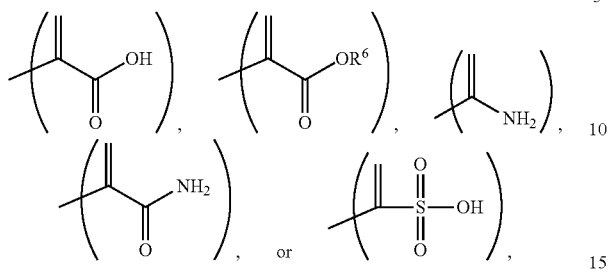

wherein $R^6$ is $C_{1-6}$ alkyl.

3. The carbon fiber precursor composition as claimed in claim 1, wherein the co-monomer is methyl acrylate, methyl methacrylate, methacrylic acid, itaconic acid, ethenamine, acrylamide, methacrylamide, vinylsulfonic acid, isobutyl methacrylate, tert-butyl methacrylate or a combination thereof.

4. The carbon fiber precursor composition as claimed in claim 1, wherein the stereoregularity controlling agent is cholic acid, deoxycholic acid, chenodeoxycholic acid, lithocholic acid, or a combination thereof.

5. The carbon fiber precursor composition as claimed in claim 1, wherein the stereoregularity controlling agent is 1,2-diaminoethane, 1,3-diaminopropane, 1,4-diaminobutane, 1,5-diaminopentane, 1,6-diaminohexane, urea, or a combination thereof.

6. The carbon fiber precursor composition as claimed in claim 1, wherein the stereoregularity controlling agent is formamide, acetamide, propionamide, butyramide, isobutyramide, valeramide, or a combination thereof.

7. The carbon fiber precursor composition as claimed in claim 1, wherein the stereoregularity controlling agent is 2-pyrrolidinone, valerolactam, caprolactam, or a combination thereof.

8. The carbon fiber precursor composition as claimed in claim 1, further comprising:
a solvent, wherein the acrylonitrile, co-monomer, and the stereoregularity controlling agent is uniformly distributed in the solvent.

9. The carbon fiber precursor composition as claimed in claim 8, wherein the solvent is dimethylsulfoxide, dimethylacetamide, dimethylforamide, tetrahydrofuran, dichloromethane, chloroform, ethylene carbonate, propylene carbonate, methylethyl ketone, or water.

10. The carbon fiber precursor composition as claimed in claim 1, further comprising:
0.01-0.3 parts by weight of initiator.

11. The carbon fiber precursor composition as claimed in claim 10, wherein the initiator is peroxide initiator, azo compound initiator, persulfate initiator, or photoinitiator.

12. A method for preparing a carbon fiber precursor, comprising:
subjecting a carbon fiber precursor composition to undergo polymerization to obtain the carbon fiber precursor, wherein the carbon fiber precursor composition comprises:
100 parts by weight of acrylonitrile;
1-15 parts by weight of co-monomer; and
0.1-3 parts by weight of stereoregularity controlling agent, wherein the stereoregularity controlling agent has a structure represented by Formula (I), Formula (II), Formula (III), or Formula (IV)

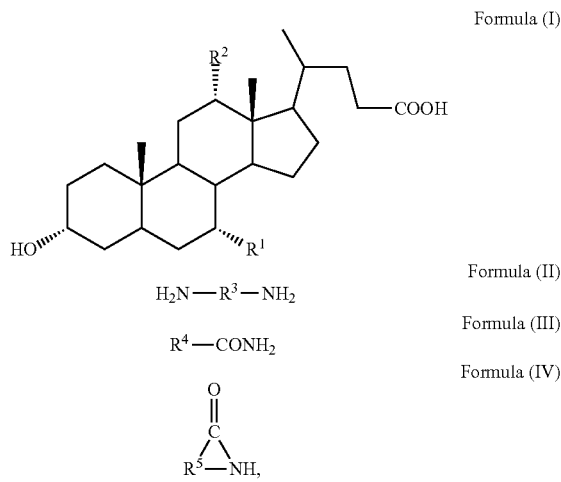

wherein $R^1$ and $R^2$ are independently hydrogen, —OH, —COOH, or —NH$_2$; $R^3$ is $C_{2-8}$ alkylene, or carbonyl; $R^4$ is hydrogen, or $C_{1-6}$ alkyl; and, $R^5$ is $C_{3-6}$ alkylene.

13. The method as claimed in claim 12, wherein the co-monomer has at least one reactive functional group, wherein the reactive functional group is

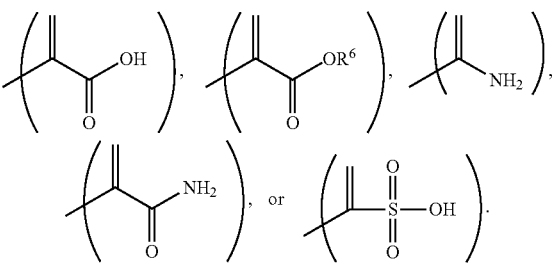

wherein $R^6$ is $C_{1-6}$ alkyl.

14. The method as claimed in claim 12, wherein the co-monomer is methyl acrylate, methyl methacrylate, methacrylic acid, itaconic acid, ethenamine, acrylamide, methacrylamide, vinylsulfonic acid, isobutyl methacrylate, tert-butyl methacrylate or a combination thereof.

15. The method as claimed in claim 12, wherein the stereoregularity controlling agent is cholic acid, deoxycholic acid, chenodeoxycholic acid, lithocholic acid, or a combination thereof.

16. The method as claimed in claim 12, wherein the stereoregularity controlling agent is 1,2-diaminoethane, 1,3-diaminopropane, 1,4-diaminobutane, 1,5-diaminopentane, 1,6-diaminohexane, urea, or a combination thereof.

17. The method as claimed in claim 12, wherein the stereoregularity controlling agent is formamide, acetamide, propionamide, butyramide, isobutyramide, valeramide, or a combination thereof.

18. The method as claimed in claim 12, wherein the stereoregularity controlling agent is 2-pyrrolidinone, valerolactam, caprolactam, or a combination thereof.

19. The method as claimed in claim 12, further comprising:

a solvent, wherein the acrylonitrile, co-monomer and the stereoregularity controlling agent is uniformly distributed in the solvent.

20. The method as claimed in claim 19, wherein the solvent is dimethylsulfoxide, dimethylacetamide, dimethylforamide, tetrahydrofuran, dichloromethane, chloroform, ethylene carbonate, propylene carbonate, methylethyl ketone, or water.

21. The method as claimed in claim 12, further comprising:
   0.01-0.3 parts by weight of initiator, wherein the initiator is peroxide initiator, azo compound initiator, persulfate initiator, or photoinitiator.

22. A carbon fiber precursor composition, comprising:
   100 parts by weight of acrylonitrile;
   1-15 parts by weight of co-monomer; and
   0.1-3 parts by weight of stereoregularity controlling agent, wherein the stereoregularity controlling agent is urea or has a structure represented by Formula (I), Formula (III), or Formula (IV):

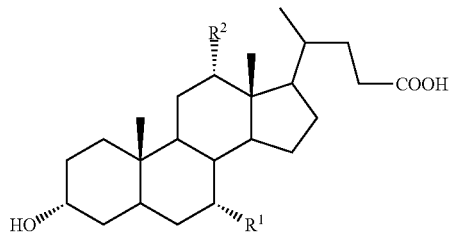

Formula (I)

$R^4$—$CONH_2$

Formula (III)

Formula (IV)

wherein $R^1$ and $R^2$ are independently hydrogen, —OH, —COOH, or —$NH_2$; $R^4$ is hydrogen, or $C_{1-6}$ alkyl; and, $R^5$ is $C_{3-6}$ alkylene.

* * * * *